FREQUENCY DOUBLERS EMPLOYING DIODE BRIDGE AND PHASE SHIFTER CIRCUIT AT THE INPUT
Filed Jan. 23, 1964
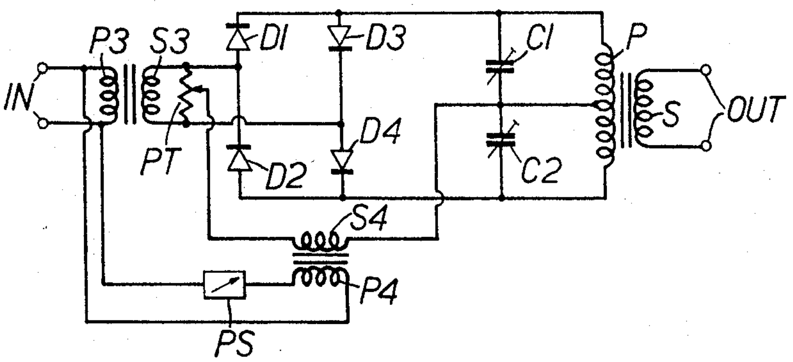
INVENTOR
Robert Stanley Robson
BY
Baldwin & Wight
ATTORNEYS United States Patent Office 3,287,572

Patented Nov. 22, 1966

3,287,572

FREQUENCY DOUBLERS EMPLOYING DIODE BRIDGE AND PHASE SHIFTER CIRCUIT AT THE INPUT

Robert Stanley Robson, Chelmsford, Essex, England, assignor to The Marconi Company Limited, Strand, London, England, a British company Filed Jan. 23, 1964, Ser. No. 339,645

Claims priority, application Great Britain, Feb. 18, 1963, 6,420/63

5 Claims. (Cl. 307—88.5)

This invention relates to frequency doublers and has for its object to provide improved and simple frequency doublers capable of operating over a wide band of frequencies. There is a common requirement for wide band frequency doublers—for example for frequency doublers capable of doubling in frequency a plurality of "spot" frequencies at, say ½ mc./s. intervals, in a wide band of frequencies e.g. 5 to 30 mc./s. This requirement is difficult to satisfy by means of relatively simple and cheap apparatus and it has been common hitherto to use frequency changers of the heterodyne type for the purpose. Such frequency changers with their necessary band pass filters and accurately tuned circuits are undesirably expensive.

According to this invention a wide band frequency doubler comprises a double bridge circuit.

In a modification the bridge is a double bridge incorporating in effect two balanced component bridges having two adjacent arms common to both, there being two similarly sensed unilaterally conductive means in series across said two adjacent arms and two further unilaterally conductive means similarly sensed in a direction opposite to that of the first mentioned two, also in series across said adjacent arms, input signals being applied through a divider input circuit between the junction point of the first mentioned unilaterally conductive means and the junction point of the further unilaterally conductive means and being also applied substantially in phase quadrature with the first input between the centre point of said divided input circuit and the centre point between the adjacent arms common to both component bridges, output being taken through a divided output circuit which is connected between the outer ends of the common part of the two component bridges and which has a centre point connected to the centre point between the adjacent arms in said common part.

The invention is illustrated in the accompanying drawing which shows diagrammatically one illustrative embodiment thereof.

Referring to the figure, the double bridge comprises elements D1, D2, C1, C2 and two additional diodes D3 and D4 similarly sensed but oppositely sensed with respect to the diodes D1 and D2. As will be seen, this double bridge consists in effect of two component bridges with the arms C1 and C2 common to both. Input is applied through an input transformer having a primary P3 and a secondary S3, the latter being connected between the junction point of D1 and D2 and the junction point of D3 and D4, and having a centre point connected to the junction point between C1 and C2 through the secondary S4 of a further transformer. The last mentioned junction point (between C1 and C2) is connected to the centre tap of the primary P of the output transformer whose secondary S is connected to the output terminals OUT. Input signals from across the primary P3 are also applied to the primary P4 of the transformer P4 S4 and the whole arrangement is such that the input signals applied through this transformer between the centre point of secondary S3 and the junction point of C1 and C2 are substantially in phase quadrature with those applied from the ends of secondary S3 between the junction point of D1 and D2 and the junction point of D3 and D4. These quadrature signals are of larger amplitude than the input signals and operate to cause pairs of the diodes D1 to D4 to become conductive during alternate half cycles. The diodes D1 and D4 are made conductive together during one-half cycle of the quadrature signal and the diodes D2 and D3 are made conductive in the other half-cycle. The obtaining of this quadrature relationship is diagrammatically indicated in the figure by showing an adjustable phase shifter Ps in the circuit of the primary P4. In the figure the obtaining of the centre point of the secondary S3 is shown as effected by means of a potentiometer PT connected across said secondary.

As will be apparent the embodiment shown will produce frequency doubled outputs which will also contain a proportion of upper harmonic components. If, in any particular case, these upper harmonics are required to be eliminated, this can easily be done, without seriously increasing the cost of the equipment, by providing a low pass filter (not shown) in the final output circuit.

Experimental practice with the invention has shown that frequency ranges of from about 20 kc./s. to about 100 mc./s. are obtainable without serious difficulty.

I claim:

1. A frequency doubler comprising four diodes coupled together in series in the same polarity in a closed loop, two impedances coupled together in series across an adjacent pair of said four diodes, a tapped impedance coupled between the junction of said adjacent pair of diodes and the junction of the other pair of said diodes, input means for applying an input signal between the junction of said adjacent pair of diodes and the junction of the other pair of said diodes, phase shifting means connected to said input means for producing at the output thereof a signal of the same frequency as said input signal but in phase quadrature therewith, the output of said phase shifting means being applied between the junction point of said two impedances and the tap of said tapped impedance, thereby producing a frequency doubled output across said two impedances.

2. A frequency doubler as defined in claim 1 and also including an output transformer having a center-tapped primary winding and a secondary winding, the halves of said primary winding comprising said two impedances, and said frequency doubled output being developed across said primary winding and being coupled to said secondary winding.

3. A frequency doubler as defined in claim 2 and also including a pair of capacitors each coupled between a corresponding end of said primary winding and the center tap thereof.

4. A frequency doubler as defined in claim 3 wherein said input means comprises a first input transformer having a primary and a secondary winding, the secondary winding thereof being coupled across said tapped impedance to apply said input signal between the junction of said adjacent pair of diodes and the junction of the other pair of said diodes.

5. A frequency doubler as defined in claim 4 wherein said phase shifting means comprises a second input transformer having primary and secondary windings, the primary winding of said second input transformer being coupled in parallel with the primary winding of said first input transformer, a phase shifter coupled in series with the primary winding of said second input transformer, and the secondary winding of said transformer being coupled between the junction point of said two impedances and the tap of said tapped impedance.

References Cited by the Examiner

UNITED STATES PATENTS

| | | | |
|---|---|---|---|
| 2,420,740 | 5/1947 | Douma | 321—69 |
| 2,946,963 | 7/1960 | Lee | 321—69 |
| 3,012,192 | 12/1961 | Lion | 323—75 |
| 3,211,986 | 10/1965 | Schultz | 321—69 |
| 3,227,955 | 1/1966 | Junichi Yasuda et al. | 321—69 |

ARTHUR GAUSS, *Primary Examiner.*

J. S. HEYMAN, *Assistant Examiner.*